US012576919B2

(12) United States Patent
Nemeth et al.

(10) Patent No.: US 12,576,919 B2
(45) Date of Patent: Mar. 17, 2026

(54) COMBINED DRIVETRAIN ACCESS PANEL AND FOOTREST

(71) Applicant: FCA US LLC, Auburn Hills, MI (US)

(72) Inventors: Michael L Nemeth, Holly, MI (US); Kevin A Spangler, Lake Orion, MI (US); Chris Borczon, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 386 days.

(21) Appl. No.: 18/453,373

(22) Filed: Aug. 22, 2023

(65) Prior Publication Data

US 2025/0065958 A1 Feb. 27, 2025

(51) Int. Cl.
 *B62D 25/24* (2006.01)
 *B62D 25/20* (2006.01)
(52) U.S. Cl.
 CPC ............. *B62D 25/24* (2013.01); *B62D 25/20* (2013.01)
(58) Field of Classification Search
 CPC ............... B62D 25/20; B62D 25/2045; B62D 25/2054; B62D 25/2063; B62D 25/24

USPC ...................................................... 296/193.07
See application file for complete search history.

(56) References Cited

U.S. PATENT DOCUMENTS

2015/0375791 A1* 12/2015 Vijayakumar ......... B62D 25/24
                                                      29/458
2016/0052467 A1* 2/2016 Dubois ................... B60K 13/06
                                                      296/193.07

FOREIGN PATENT DOCUMENTS

DE      102021210855 A1 * 3/2023 ............. B62D 25/24

* cited by examiner

*Primary Examiner* — Jason S Daniels
(74) *Attorney, Agent, or Firm* — Jeremy J. Klobucar

(57) ABSTRACT

A vehicle including a vehicle cabin floor having an aperture formed therein for providing access to a vehicle drivetrain component located beneath the vehicle cabin floor. The aperture is covered by a removable panel. The removable panel, in addition to providing access to the vehicle drivetrain component, also includes a planar section that may serve as a footrest of a passenger located in the vehicle.

9 Claims, 8 Drawing Sheets

COMBINED DRIVETRAIN ACCESS PANEL AND FOOTREST

FIELD

The present disclosure relates to a vehicle with a removable panel for access to a drivetrain component.

BACKGROUND

This section provides background information related to the present disclosure which is not necessarily prior art.

Power take-off modules belong to a greater classification of after-market transmission additions commonly known as gear boxes, which may be affixed to a vehicle transmission or other drivetrain component. Such modules provide additional versatility to standard vehicle operation by redirecting a portion of the vehicle engine power to alternative tasks such as a hydraulic lift. These modules are most commonly seen in large utility vehicles such as garbage trucks, firetrucks, and tractors, but mid-sized vehicles such as pickup trucks capable of utilizing power take-off modules have grown substantially in popularity due to their comparative affordability and the ability of a vehicle operator to perform an assortment of additional tasks beyond simple cargo transport without the requirement for secondary engine power.

To provide auxiliary power, power take-off modules may be mounted to the vehicle transmission, as power is typically generated by enmeshment of the power take-off module gears with the external gears of a vehicle transmission. Conventional installation of a power take-off module occurs from the bottom side of the vehicle, which requires a service operator to climb under the vehicle or utilize a hoist for transmission access. This process is cumbersome, necessitates additional service costs, and the time spent performing this service from the underside of the vehicle may result in lost productive hours for a vehicle owner. In addition, existing vehicle floor panel configurations for accommodating power take-off module installations greatly reduce the passenger footrest space in the vehicle's passenger cabin as the positioning of the module requires the floor panel to be formed such that it protrudes into the footrest space of the passenger. These configurations are also limited in size and may only accommodate a small range of power take-off module sizes and designs. There is a need, therefore, to provide access to a vehicle's transmission from the top side of the vehicle for ease of power take-off module installation and service, as well as provide an improvement of overall passenger comfort during travel.

SUMMARY

This section provides a general summary of the disclosure and is not a comprehensive disclosure of its full scope or all of its features.

According to an aspect of the present disclosure, there is provided a vehicle that includes a passenger cabin having a floor. The passenger cabin includes a driver side compartment and a passenger side compartment positioned laterally adjacent to the driver side compartment. An aperture having an outer perimeter is formed in a portion of the floor located in the passenger side compartment that provides access to a drivetrain component of the vehicle located beneath the floor, and a removable panel is configured to mate with the aperture. The removable panel is configured to provide access to the drivetrain component when removed from the aperture. The removable panel includes a planar section that overlaps the drivetrain component and an angled section that extends from the planar section and mates with the outer perimeter of the aperture, and the planar section of the removable panel and the floor located in the passenger compartment located outboard from the outer perimeter are each configured to serve as a footrest for an occupant of the vehicle located in the passenger side compartment.

According to the aspect, the planar section of the removable panel is substantially parallel to the floor of the passenger compartment.

According to the aspect, the removable cover provides a packaging space between the drivetrain component and the planar section that is configured to accommodate a plurality of power take-off modules attached to the drivetrain component that have different dimensions.

According to the aspect, the removable panel includes an apron extending about a perimeter of the removable panel having a plurality of through-holes configured for receipt of a fastener to secure the removable panel to the floor.

According to the aspect, the planar section is surrounded by a first side surface, a second side surface, a third side surface, and a fourth side surface.

According to the aspect, the first side surface transitions to a substantially planar and downwardly extending sidewall, which then transitions to the apron that extends outward from the downwardly extending sidewall.

According to the aspect, the second side surface transitions to the apron, which extends upward relative to planar section.

According to the aspect, the third and fourth side surfaces each transition into downwardly angled sidewalls, which then transition to the apron.

According to the aspect, the downwardly angled sidewalls are angled relative to the planar section at an angle that may range between 40 to 60 degrees.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
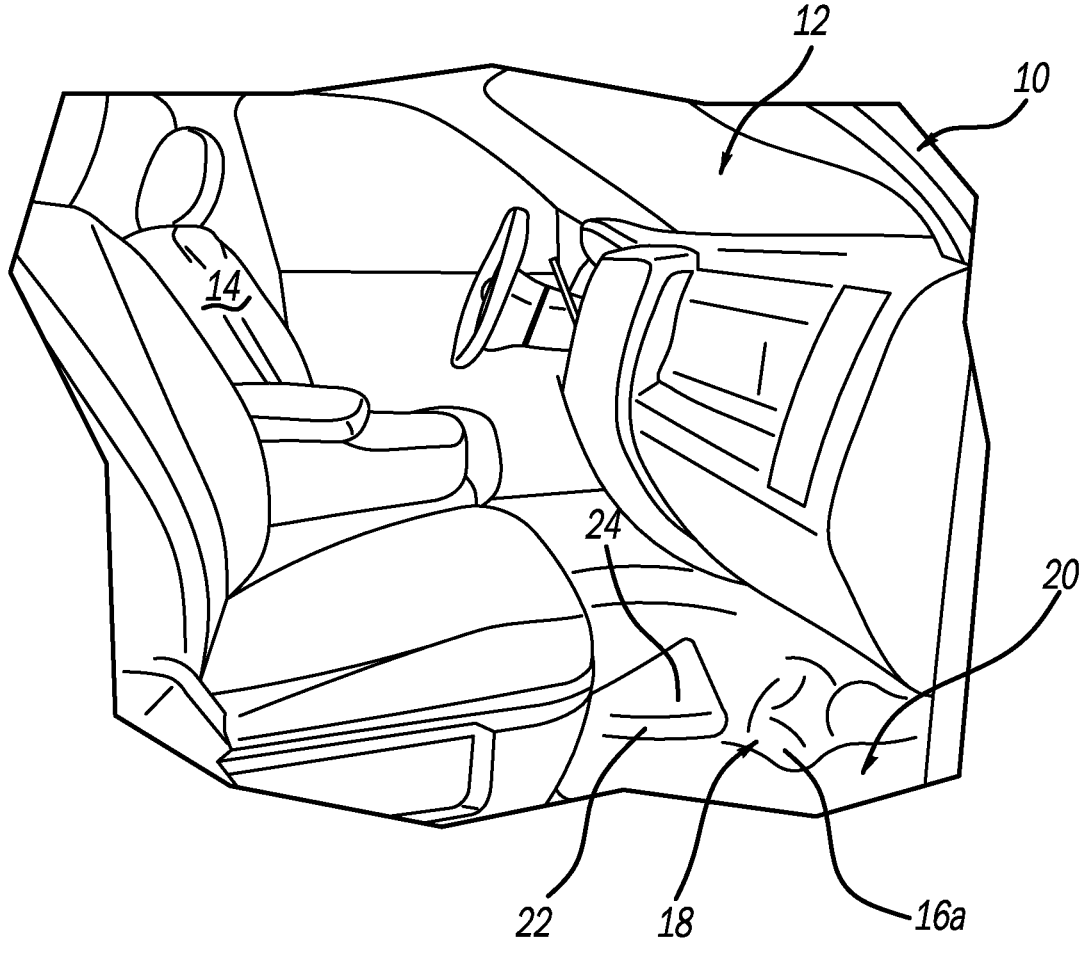
FIG. 1 is a perspective view of a conventional interior of a vehicle passenger cabin.

With reference to FIG. 1, a portion of a prior art vehicle 10 is illustrated. Vehicle 10 includes a passenger cabin 12, which in the illustrated embodiment includes a pair of front passenger seats 14 that are connected by a vehicle cabin floor 16*a*. A passenger side compartment 18 of cabin 12 may include a passenger footwell area 20 that is part of vehicle cabin floor 16*a*.

As shown in FIG. 1, a portion 22 of the passenger footwell area 20 includes an angled section 24. Portion 22 includes angled section 24 to account for packaging restraints of a vehicle powertrain component (not shown in FIG. 1) that is located beneath angled section 24. Unfortunately, angled section 24 is angled to an extent that it is not comfortable for a passenger sitting in the seat 14 located in passenger side compartment 18 to rest their feet, and the angled section 24 also reduces the remaining area of the passenger footwell area 20. Put another way, the amount of space that a passenger may properly rest their feet that is adjacent to the angled section 24 is reduced, which can also be uncomfortable.

Figure 2:
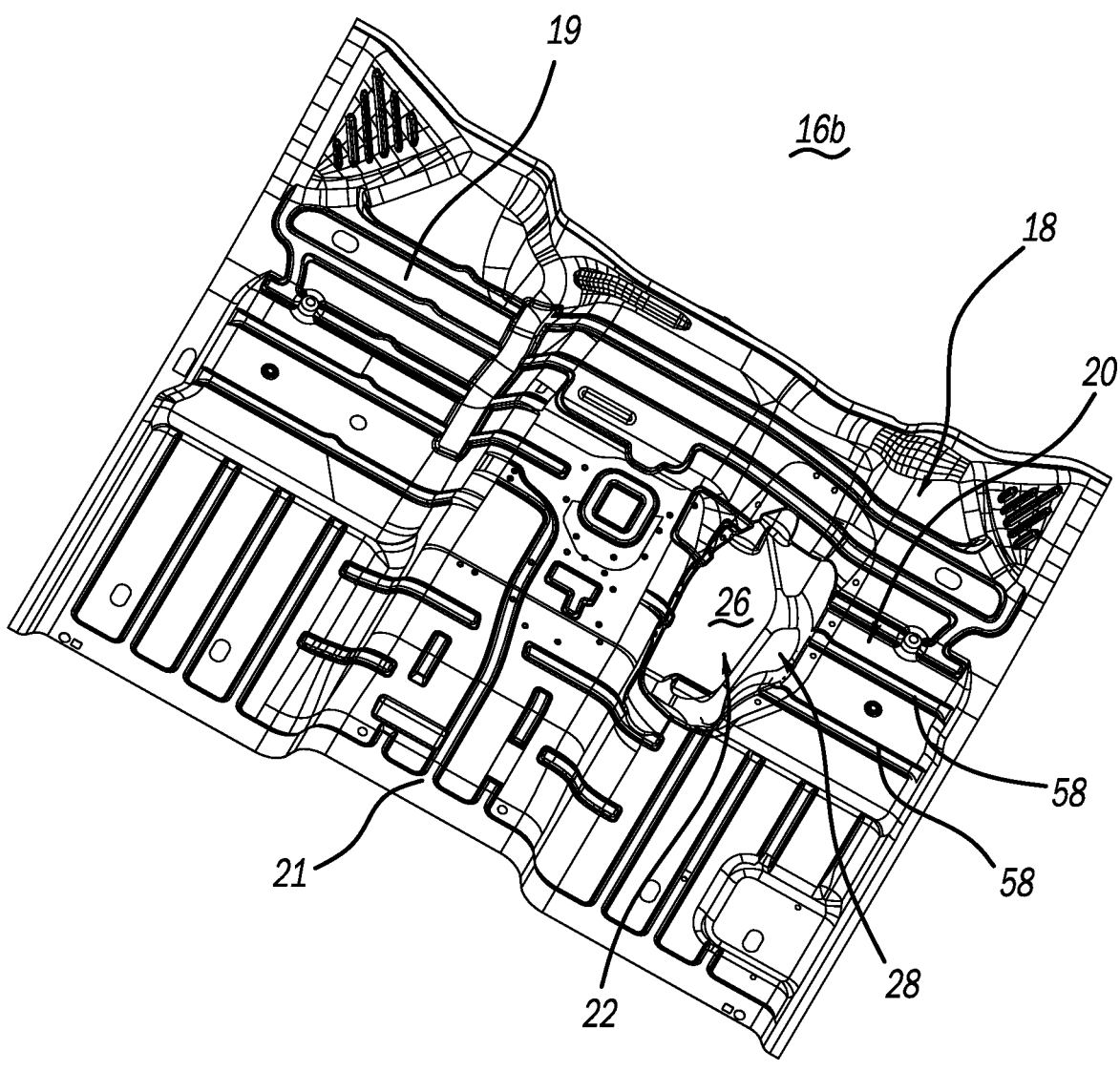
FIG. 2 is a perspective view of a floor panel of a vehicle including a removable panel according to a principle of the present disclosure.
Figure 3:
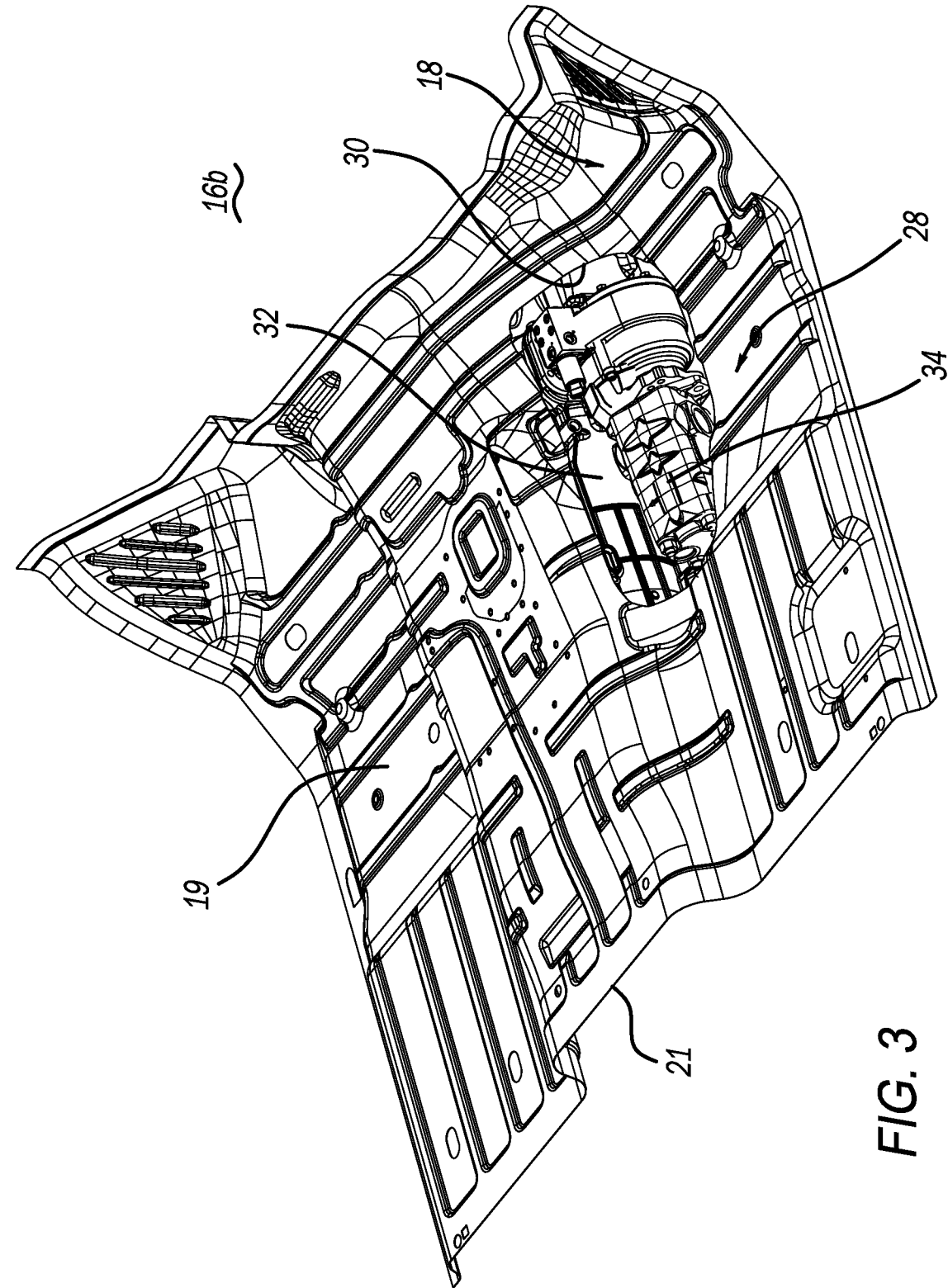
FIG. 3 is a perspective view of the floor panel shown in FIG. 2 with the removable panel removed to provide access to a vehicle powertrain component according to a principle of the present disclosure.
Figure 4:
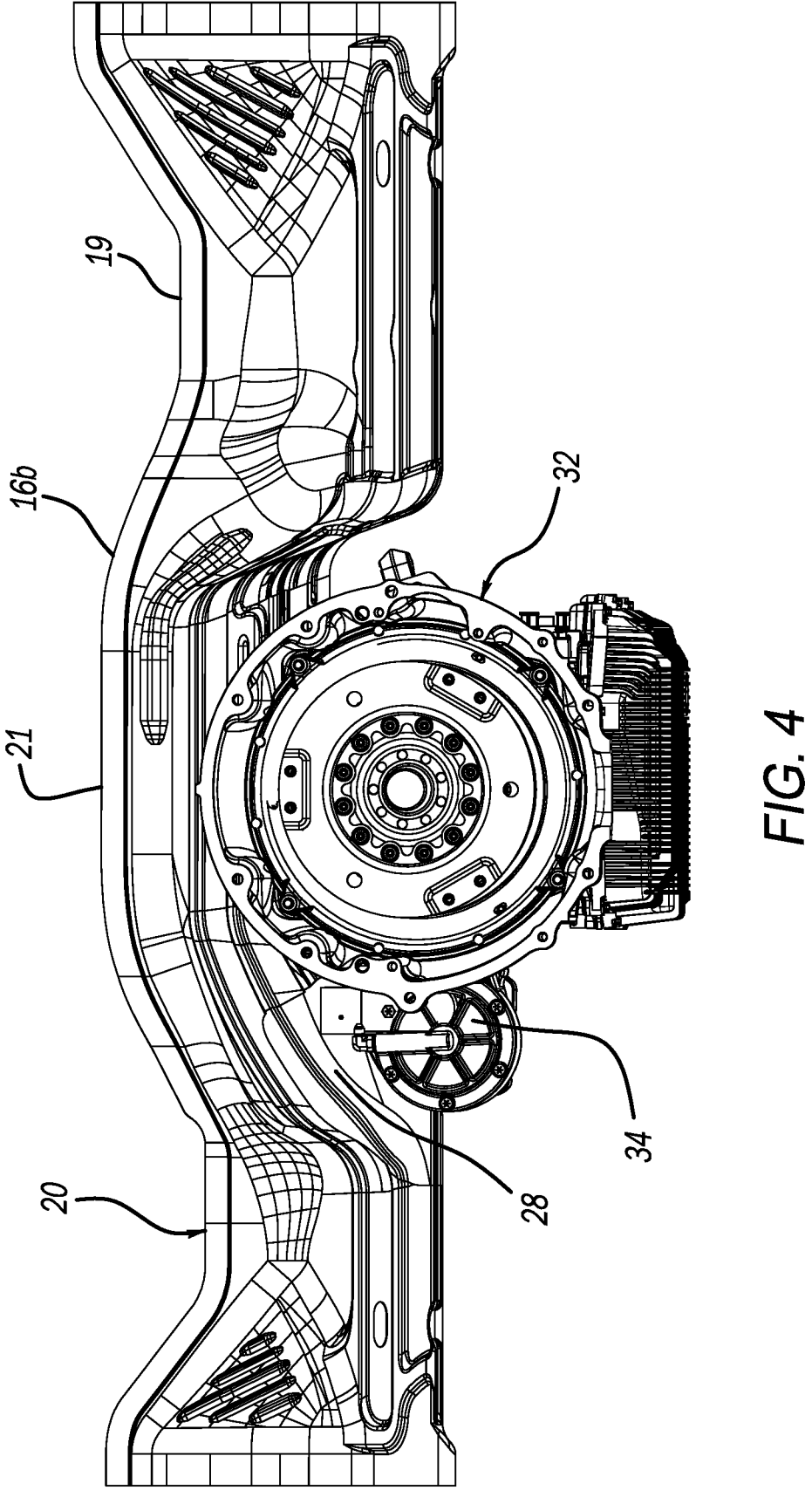
FIG. 4 is a front perspective view of the vehicle floor panel illustrated in FIG. 2, and further illustrating a spatial relationship between the vehicle floor panel and the vehicle powertrain component.

With the above in mind and now referring to FIGS. 2 to 4, the present disclosure provides a vehicle cabin floor 16*b* that may be incorporated into the vehicle 10 illustrated in FIG. 1. Vehicle cabin floor 16*b* includes a driver-side footwell area 19 and a passenger footwell area 20 that are separated by a hump 21, which provides packaging space beneath vehicle cabin floor 16*b* for a powertrain component 32 (FIG. 3). A portion 22 of passenger footwell area 20 that is improved relative to that shown in FIG. 1. More specifically, as can be seen in FIG. 2, the portion 22 of passenger footwell area 20 includes a flat section 26 upon which a passenger may comfortably rest a foot or feet. In addition, it should be understood that flat section 26 is part of a removable panel 28 that covers an aperture 30 provided in vehicle cabin floor 16*b* that, when removed from aperture 30, provides access to vehicle powertrain component 32.

In the illustrated embodiment, vehicle powertrain component 32 may be a transmission of vehicle 10 that includes a power take-off module 34 attached thereto. Advantageously, if vehicle 10 is purchased without a power take-off module 34 or an existing power take-off module 34 requires service, removable panel 28 can be removed to enable easy access to the powertrain component 32 to either install a new power take-off module 34 or service the existing power take-off module 34. Notably, the design of removable panel 28 including flat section 26 enables the use of power take-off modules 34 that are manufactured by different manufacturers. Put another way, various aftermarket power take-off modules 34 are available from different manufacturers, which may have different dimensions that have different packaging requirements. Notwithstanding the different dimensions, the flat section 26 of removable panel 28 is designed in such a way that the customer can select a power take-off module 34 for installation even though such a module 34 would not previously fit in the packaging space between powertrain component 32 and the vehicle cabin floor 16 of the conventional vehicle illustrated in FIG. 1, which will be described in more detail later.

Vehicle cabin floor 16*b* and removable panel 28 may each be formed of a sheet metal material such as steel, aluminum, or any other type of rigid metal material known to one skilled in the art. While not illustrated in FIGS. 2 and 3, it should be understood that a carpet may lie overtop each of vehicle cabin floor 16*b* and removable panel 28 during normal use of vehicle 10. In the event that removable panel 28 needs to be removed to provide access to powertrain component 32 and/or power take-off module 34, the carpet can be removed to provide access to removable panel 28 such that removable panel 28 can be removed and expose powertrain component 32 and/or power take-off module 24.

Figure 5:
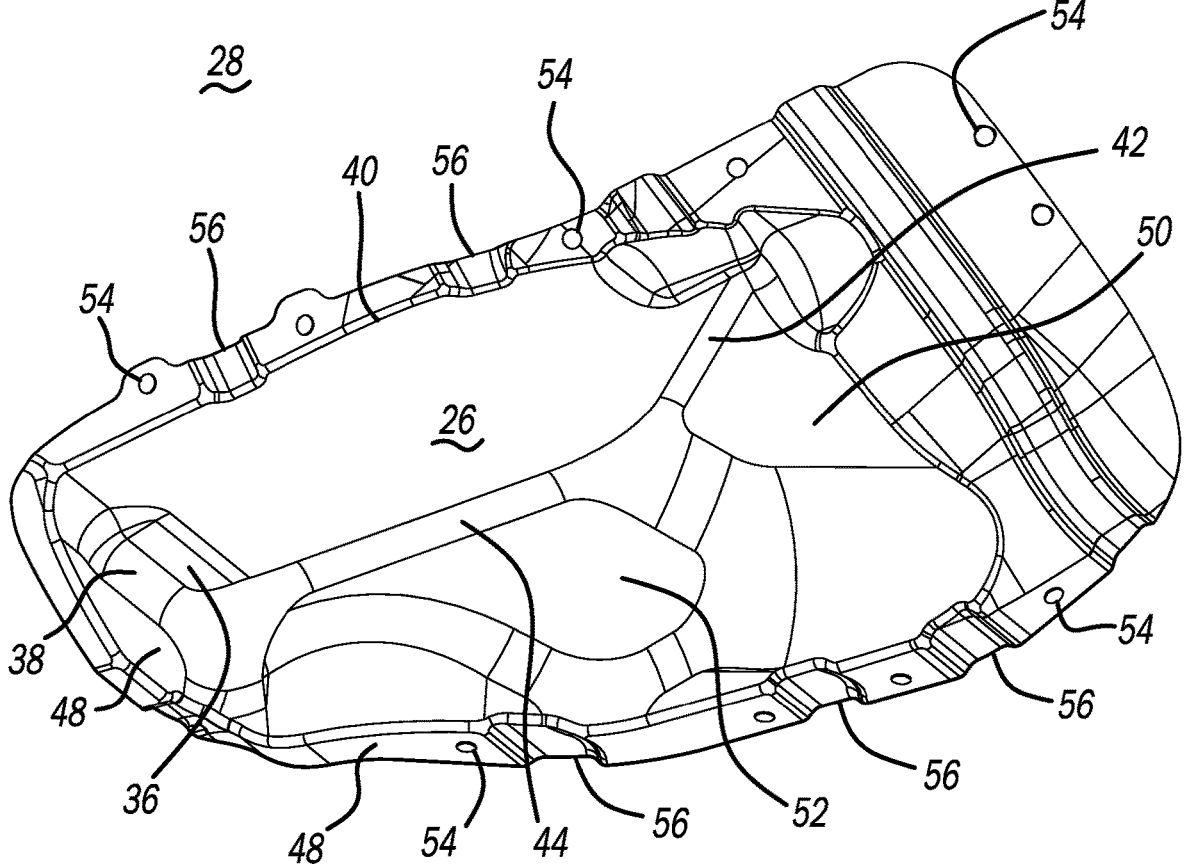
FIG. 5 is a top perspective view of the removable panel according to the present disclosure.
Figure 6:
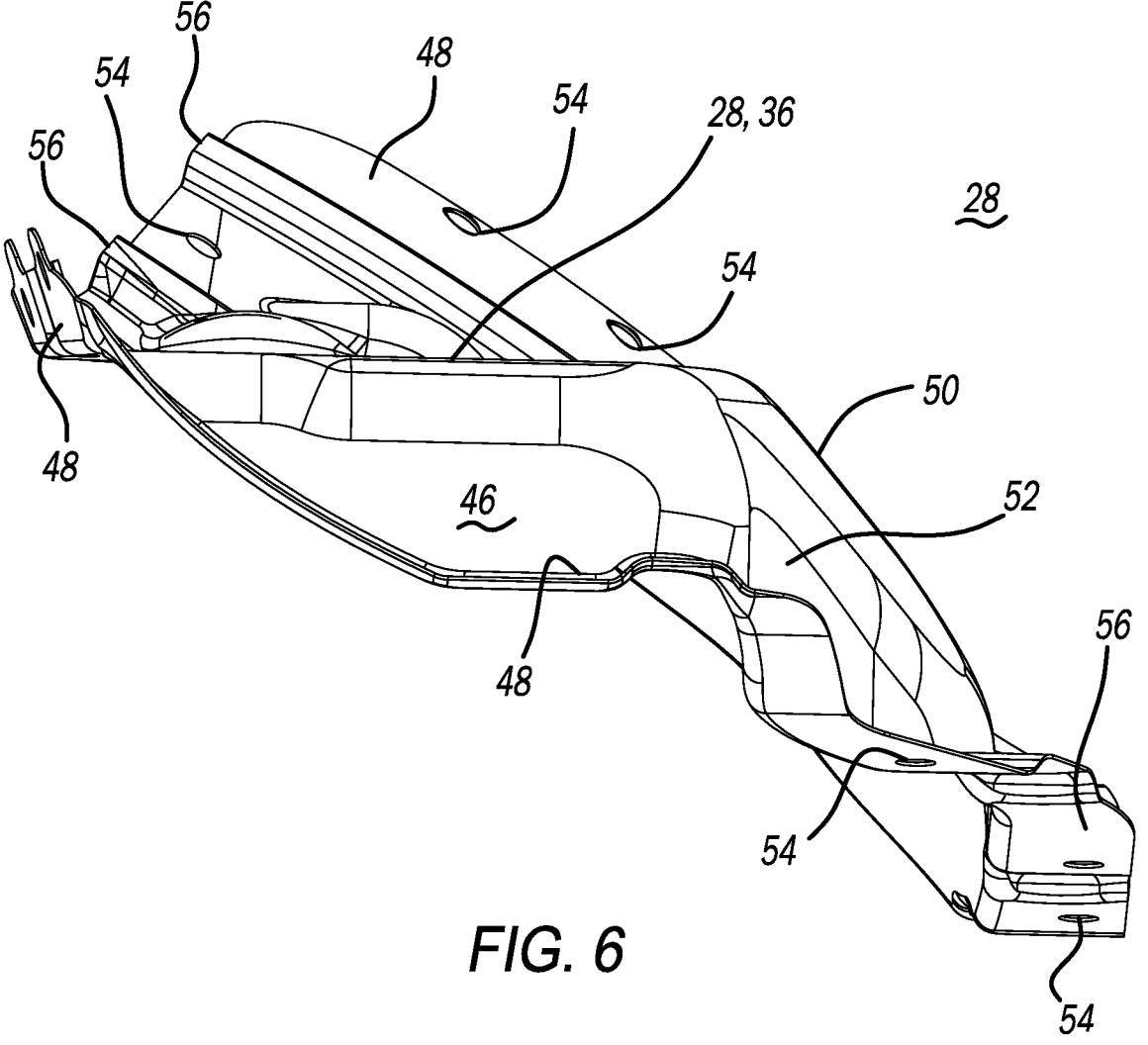
FIG. 6 is a rear perspective view of the removable panel illustrated in FIG. 4.

Removable panel 28 32 is shown in greater detail in FIGS. 5 and 6. Removable panel 28 includes flat section 26, which is a planar, or at least substantially planar surface, 36, that provides a passenger in the vehicle 10 a comfortable upon which to rest their foot or feet. Planar surface 36 is surrounded by a first side surface 38, a second side surface 40, a third side surface 42, and a fourth side surface 44. First side surface 38 transitions to a substantially planar and downwardly extending sidewall 46, which then transitions to an outwardly extending skirt or apron 48 that extends about a perimeter of removable panel 28. Second side surface 40 transitions to apron 48, which as best seen in FIG. 6 extends upward relative to planar surface 36. Side surfaces 42 and 44 each transition into downwardly angled sidewalls 50 and 52, which then also each transition to apron 48. Downwardly angled sidewalls 50 and 52 are angled relative to planar surface 36 at an angle that may range between 40 to 60 degrees.

Apron 48 includes a plurality of through holes 54 that permit removable panel 28 to be fixed to vehicle cabin floor 16*b* about aperture 30 using a plurality of fasteners (not shown). Apron 48 may also include a plurality of recesses 56 that are configured for receipt of various ribs 58 (FIG. 2) that may be formed in vehicle cabin floor 16*b*, which may assist with mating removable panel 28 relative to aperture 30 when attaching removable panel 28 to vehicle cabin floor 16*b* to cover aperture 30.

Figure 7:
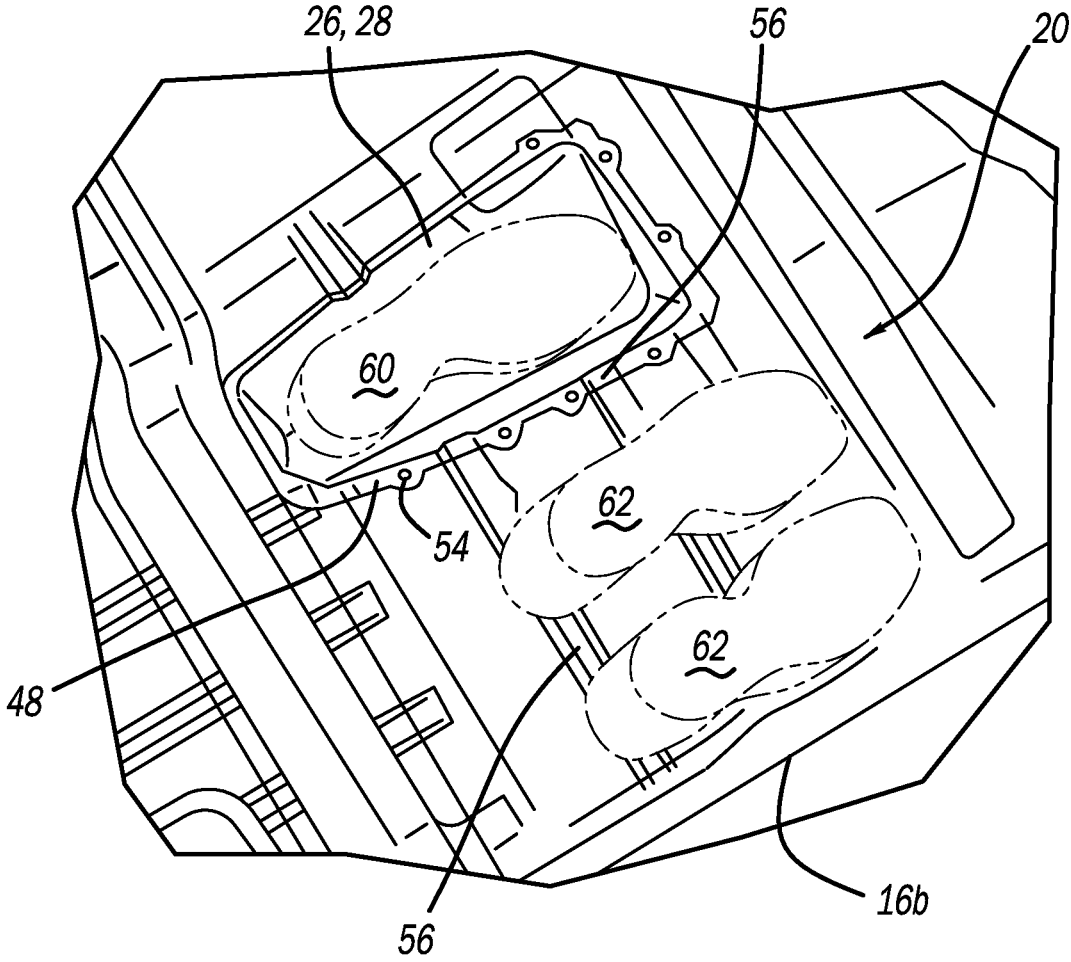
FIG. 7 is an enlarged perspective view of the floor panel of the vehicle shown in FIG. 2, which also illustrates the potential locations for a passenger to rest their feet on the floor panel.

With reference to FIG. 7, the relative positioning of a passenger's feet in the passenger footwell area 20 using removable panel 28 is shown. As can be seen in FIG. 7, a passenger's left foot 60 (shown in phantom) may easily and comfortably rest upon planar surface 26 of removable panel 28. Moreover, it can be seen that because sidewall 52 is angled relative to planar surface 26 at a relative steep angle, there is a suitable area in passenger footwell area 20 for the passenger to comfortably rest each of their feet 62 without being obstructed by removable cover 28.

Figure 8:
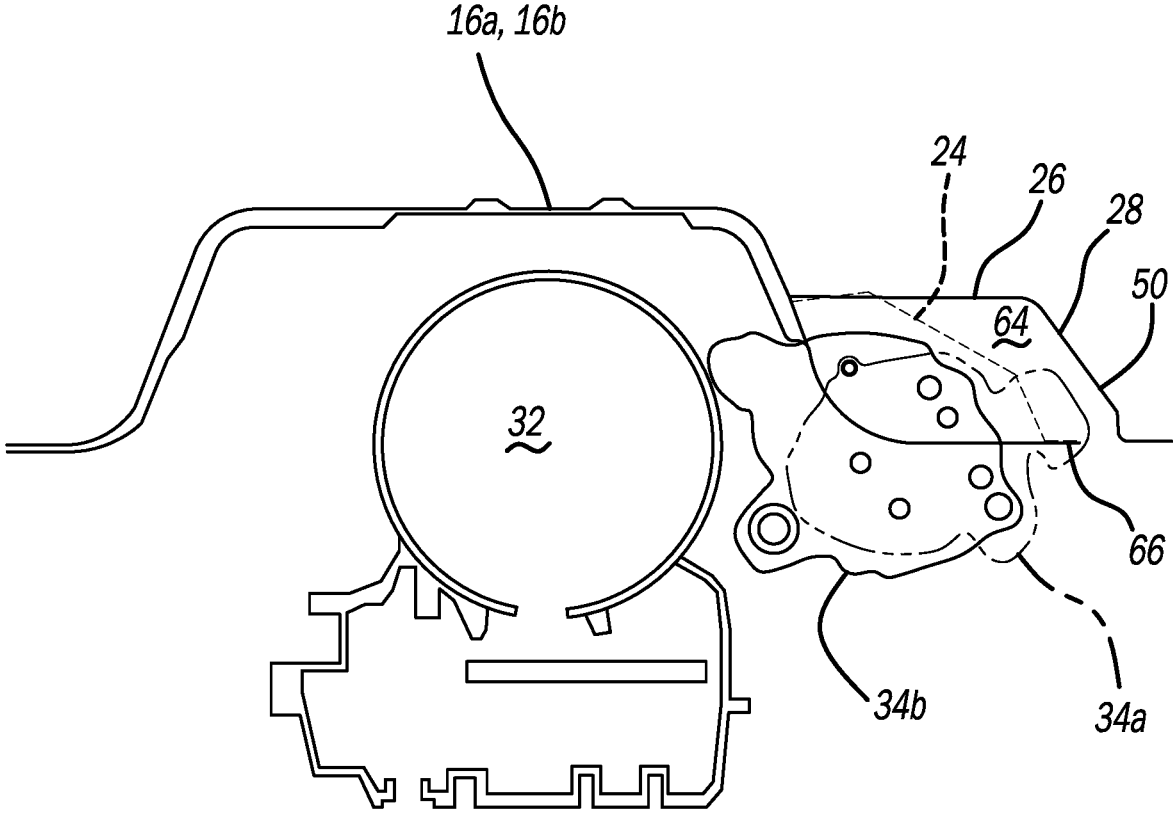
FIG. 8 is a cross-sectional view comparing a prior art floor panel to the floor panel according to the present disclosure.

Now referring to FIG. 8, each of the conventional vehicle cabin floor 16*a* and the vehicle cabin floor 16*b* according to the present disclosure are illustrated. In addition, a pair of power take-off modules 34*a* and 34*b* are illustrated, which are power take-off modules 34 manufactured by different manufacturers and, therefore, have different dimensions and packaging requirements.

As can be seen in FIG. 8 that the angled section 24 of the conventional vehicle cabin floor 16*a* would not provide a comfortable location to rest one's foot due to the steep angle of angled section 24 in comparison to the planar surface 26 that is provided by the removable panel 28. Moreover, it can be seen that the angled section 24 of the conventional vehicle cabin floor 16*a* precludes the use of the power take-off module 34a due to interference 66 that results from the location of the angled section 24. The removable panel 28, in contrast, provides enough packaging space 64 for each of the power take-off modules 34a and 34b that are illustrated. Thus, in addition to providing access to powertrain component 32 and power take-off module 34 for installation and/or service and providing a more comfortable surface 26 for resting one's foot, the removable panel 26 enables one to choose from a greater number of power take-off modules for installation on vehicle 10, which can increase the number of functions that can be achieved using vehicle 10. Put another way, because space 64 is configured to accommodate power take-off modules 34 that are manufactured by different manufacturers and have different dimensions, the vehicle 10 is not precluded from performing various functions (e.g., hydraulic lift) that cannot be performed with power take-off modules 34 that may have smaller dimensions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:
    a vehicle body defining a passenger cabin having a floor, the passenger cabin including a driver side compartment and a passenger side compartment positioned laterally adjacent to the driver side compartment;
    an aperture having an outer perimeter formed in a portion of the floor located in the passenger side compartment that provides access to a drivetrain component of the vehicle located beneath the floor; and
    a removable panel configured to mate with the aperture, the removable panel being configured to provide access to the drivetrain component when removed from the aperture, wherein the removable panel includes a planar section that overlaps the drivetrain component and an angled section that extends from the planar section and mates with the outer perimeter of the aperture, and
    wherein the planar section of the removable panel and the floor located in the passenger compartment located outboard from the outer perimeter are each configured to serve as a footrest for an occupant of the vehicle located in the passenger side compartment.

2. The vehicle according to claim 1, wherein the planar section of the removable panel is substantially parallel to the floor of the passenger compartment.

3. The vehicle according to claim 1, wherein the removable cover provides a packaging space between the drivetrain component and the planar section that is configured to accommodate a plurality of power take-off modules attached to the drivetrain component that have different dimensions.

4. The vehicle according to claim 1, wherein the removable panel includes an apron extending about a perimeter of the removable panel having a plurality of through-holes configured for receipt of a fastener to secure the removable panel to the floor.

5. The vehicle according to claim 4, wherein the planar section is surrounded by a first side surface, a second side surface, a third side surface, and a fourth side surface.

6. The vehicle according to claim 5, wherein the first side surface transitions to a substantially planar and downwardly extending sidewall, which then transitions to the apron that extends outward from the downwardly extending sidewall.

7. The vehicle according to claim 5, wherein the second side surface transitions to the apron, which extends upward relative to planar section.

8. The vehicle according to claim 5, wherein the third and fourth side surfaces each transition into downwardly angled sidewalls, which then transition to the apron.

9. The vehicle according to claim 8, wherein the downwardly angled sidewalls are angled relative to the planar section at an angle that may range between 40 to 60 degrees.

* * * * *